United States Patent [19]

Gunnergaard

[11] 3,744,551
[45] July 10, 1973

[54] MACHINE FOR PRODUCING MOULDS CONSISTING OF IDENTICAL MOULD PARTS THAT ARE LINED UP AGAINST EACH OTHER

[75] Inventor: Marius Gunnergaard, Lyngby, Denmark

[73] Assignee: Dansk Industri Syndikat A/S, Herlev, Denmark

[22] Filed: Feb. 25, 1972

[21] Appl. No.: 229,426

[30] Foreign Application Priority Data
Mar. 4, 1971   Denmark............................ 1015/71

[52] U.S. Cl................ 164/183, 164/187, 164/207
[51] Int. Cl. ...................... B22c 15/02, B22c 17/08
[58] Field of Search................... 164/183, 187, 207, 164/40

[56] References Cited
UNITED STATES PATENTS
3,556,196   1/1971   Buhler ............................ 164/187 X
3,628,592   12/1971   Taccone ............................ 164/183

Primary Examiner—Robert D. Baldwin
Attorney—Dwight Hunter Smiley et al.

[57] ABSTRACT

In a mould part producing machine the moulds are successively pressed between an upper and a lower pattern board in a vertical chamber. By a downward movement the mould part is displaced out of the chamber and, while supported by the lower pattern board and a lateral support member, is tilted into a position from which it can be pushed onto a guideway on which the mould is successively assembled and is intermittently advanced.

2 Claims, 5 Drawing Figures

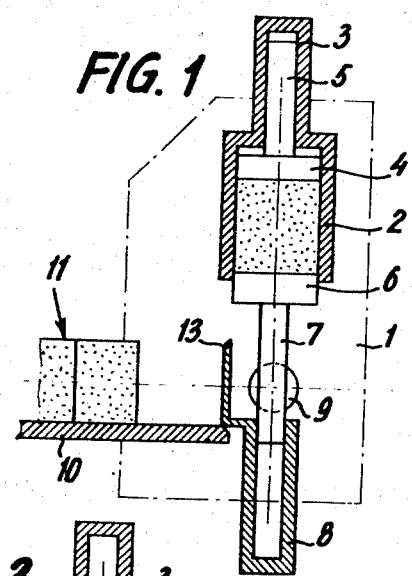
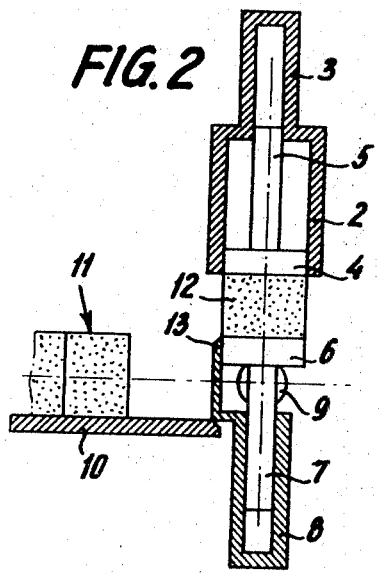
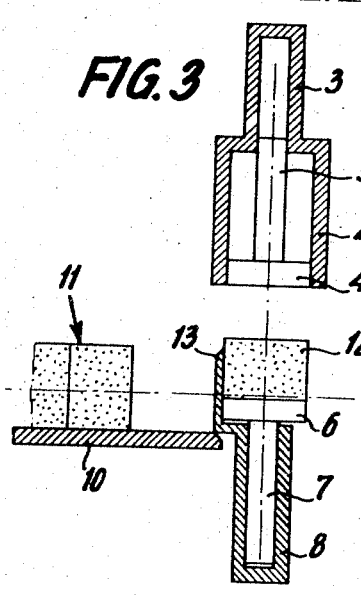
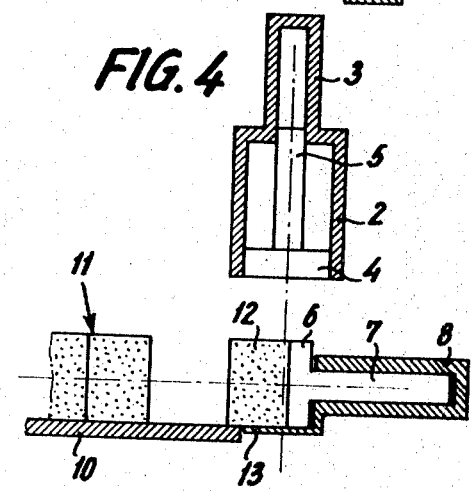
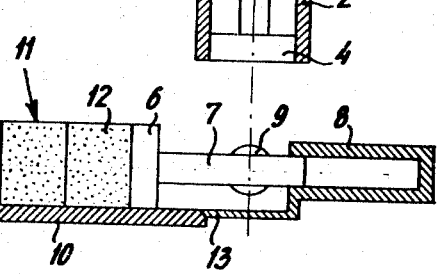

MACHINE FOR PRODUCING MOULDS CONSISTING OF IDENTICAL MOULD PARTS THAT ARE LINED UP AGAINST EACH OTHER

When manufacturing moulds of the type which consist of identical mould parts that are closely lined up against each other, the mould part production proper normally takes place by the sand material being compressed between a pair of pattern boards which form end walls in a chamber, the axis of which is horizontal and whose bottom is situated in alignment with a conveyor or guideway, on which the mould parts are lined up against each other and advanced step by step concurrently with the mould part manufacturing process. After one mould part has been compressed, the pattern board, or the so-called counter-pressure plate, facing the guideway is removed, whereupon the other pattern board, or the pressure plate, is utilized to push the mould part out onto the guideway in order to be lined up against the row of mould parts formed previously.

In the course of the compressing operation and particularly during the displacement of the mould part from the chamber to the guideway, substantial wear and tear takes place on the bottom plate of the chamber and the underside of the pattern board serving as pressure plate. From the published specification of German Pat. application No. 1,962,549, a machine of the type outlined in the foregoing is known, in which, however, the compressing operation takes place in the vertical direction, subsequent to which the compressing chamber, in conjunction with the pressure plate and the mould part formed, is tilted by an angle of 90° into a position where the mould part, by means of the pressure plate, can be pushed out onto the guideway as explained above. In this case, the wear and tear on the chamber wall that occurs during the compressing operation will be distributed fairly uniformly over its entire circumference, but the greatest part of the total wear and tear, that is to say the part which is due to the friction between the chamber and the mould part in the course of its expulsion movement, is concentrated on the side of the chamber wall that faces downwardly subsequent to the chamber having been tilted by 90°. When a high degree of accuracy is required of the mould parts that are produced, this wear and tear will have to be compensated for from time to time, which, however, is difficult to effect in practice.

Another disadvantage connected with the prior art machine operating with vertical compression of the mould parts is the circumstance that their density and hardness will diminish from one terminal surface to the other. This is due to the fact that the compressing action is effected by an upward movement of the lower pattern board in the direction towards the upper, stationary pattern board. Before the start of the compressing operation proper, the sand material with which the chamber is filled, will, due to the gravitational effect, have a greater density near the lower pattern board or the pressure plate than near the upper pattern board or counter-pressure plate and, in the course of the compressing operation, this difference in the density will be retained or increased on account of the internal friction in the sand material as well as the friction against the side wall of the chamber.

By means of the present invention it is endeavoured to provide a machine by which the disadvantages pointed out in the foregoing are eliminated and other advantages are obtained.

Thus, the invention relates to a machine serving to produce moulds consisting of identical mould parts that are lined up against each other, which machine, in a manner known per se, comprises a chamber in which a measured quantity of mould sand is compressed vertically between opposite upper and lower pattern boards and a mechanism for tilting the mould part formed in the compressing chamber together with the lower pattern board until the axial direction of the mould part becomes horizontal, and a horizontal guideway on which the mould parts are successively lined up against each other in that the mould part that is produced last, by means of pressure exerted via said lower pattern board, is moved onto the guideway so as to abut against the preceding mould part. According to the invention, such a machine is characteristic in that the compressing chamber is stationary, and the two pattern boards, subsequent to the compression of the mould part, are jointly displaceable in a downward direction so as to expel the mould part from the chamber, and in that the tilting mechanism is provided with a lateral mould part supporting member which, during the expulsion movement, is aligned with part of the inside of the compressing chamber and which, subsequent to the tilting operation, is flush with the guideway.

In this case, the compressing of the sand to form a mould part can be performed by a downward movement of the upper pattern board, that is to say in the direction of the gravitational force, which renders possible the production of mould parts whose density or hardness, in a matter of speaking, does not vary between the terminal surfaces. The use of a stationary compressing chamber results in the additional advantage that the total amount of wear and tear will be distributed uniformly over the entire circumference as not only the compressing operation, but also the expulsion of the mould parts from the chamber, takes place in the vertical direction. The horizontal displacement of the mould part takes place on said lateral mould part supporting member after the termination of the tilting movement, and any wear on this lateral supporting member may be compensated in a simple manner.

Additional advantages presented by the machine according to the invention are that due to the stationary compressing chamber the design becomes relatively uncomplicated, and that it will be possible to reduce the total weight of the tiltable component parts down to a minimum.

According to the invention it is preferred that the tilting axis of the tilting mechanism intersects the plane, determined by the axes of the compressing chamber and of the mould parts disposed on the guideway, at or near the point of intersection of these axes. It is possible to ensure hereby that the mould part, in the course of the tilting movement, will only be subjected to minimal effects from the centrifugal force.

The invention will now be more fully described with reference to the accompanying drawings which illustrate the essential parts of the machine in five different positions during its operating cycle.

The machine comprises a frame 1 (not shown in greater detail) with a stationary, vertical compressing chamber 2 carrying a pressure cylinder 3 at its top. Compressing chamber 2 contains an upper pattern board 4, hereinafter referred to as pressure plate, which is carried by the lower end of a piston 5 operating in cylinder 3. Ordinary elements (not shown in the drawings) may be employed to control the supply and the discharge of the pressure fluid to and from cylinder 3.

In the position in FIG. 1, compressing chamber 2 is shown closed at the bottom by a lower pattern board 6, hereinafter referred to as the counter-pressure plate, that is carried by the upper end of a piston 7 operating in a pressure cylinder 8 which likewise is equipped with necessary means for controlling the supply and discharge of pressure fluid. Cylinder 8 is, in a manner not shown in greater detail, pivotably supported in a bearing 9 in frame 1. This bearing, in the embodiment illustrated, is so located that its axis intersects the vertical axis of compressing chamber 2.

In addition, a table or guideway 10 forms part of the machine, on which the mould 11 is successively constructed and advanced as a string of mould parts.

In FIG. 1, the space between the pressure plate 4 and counterpressure plate 6 is filled with a measured quantity of moulding sand which, with the aid of compressed air, can be injected into the chamber through one or several suitable apertures, for example, gaps (not shown) in the chamber wall. When the sand is injected through the vertical wall of the compressing chamber, a considerable degree of latitude is present with respect to the design and location of the injection apertures so that it is possible to ensure the most expedient distribution of sand relative to the shape and size of the patterns inside the chamber. In the case of existing machines that operate with vertical injection of the sand, the gravitational effect imposes rather narrow limits as to the size of the injection aperture.

After the compressing chamber has been filled and while counter-pressure plate 6 is held in the position shown, a downward movement is imparted to pressure plate 4 whereby the mould sand is compressed so as to form a mould part 12. When the compression operation proper is concluded, the downwardly directed movement of pressure plate 4 is continued to the position shown in FIG. 2 and, concurrently herewith, counter-pressure plate 6 is likewise moved downwards so that mould part 12 is moved from chamber 2 while being securely held between the two plates 4 and 6.

From the position shown in FIG. 2, counter-pressure plate 6 continues its downward movement to the position illustrated in FIG. 3 whereby mould part 12 gets clear of pressure plate 4 which remains in the lower end of compressing chamber 2. Mould part 12 will subsequently rest on counter-pressure plate 6, but it will, at the same time, be in lateral abutment against a lateral supporting member 13 which is aligned with the left-hand side of compressing chamber 2 and is rigidly connected to cylinder 8.

From the position shown in FIG. 3, cylinder 8, in conjunction with counter-pressure plate 6, lateral supporting member 13 and mould part 12, is tilted into the position shown in FIG. 4 where lateral supporting member 13 is flush with guideway 10.

Following this, counter-pressure plate 6 is imparted a left-directed movement whereby mould part 12 is pushed out onto guideway 10 and joins the previously produced mould 11, FIG. 5.

Subsequently a new operating cycle can be initiated after the components have been returned to the position shown in FIG. 1.

I claim:

1. A machine for producing foundry moulds consisting of identical mould parts that are lined up against each other to form at least one casting cavity bounded by each pair of successive mould parts, comprising a stationary mould part pressing chamber with a vertical axis and with upper and lower vertically movable pattern boards to compress and model mould material fed into said chamber, means to displace said pattern boards with mould part therebetween downwardly until said mould part is expelled from said chamber and then to further displace said lower pattern board with said mould part relative to said upper pattern board, a horizontal guideway to successively receive the mould parts produced and to support the mould in such a way that it may be intermittently advanced thereon, a mechanism for tilting said lower pattern board with said mould part from its expelled position to a position in which its axis is horizontal, and a lateral mould part supporting member which during the displacement of the pattern boards with the mould part therebetween is aligned with part of the wall of said chamber and by said tilting becomes flush with said guideway.

2. A machine as claimed in claim 1, wherein the tilting axis of said lower pattern board intersects the plane, defined by the axes of said chamber and of the mould parts standing on said guideway, in the region of the point of intersection of said plane defining axes.

* * * * *